(12) United States Patent
Nijhawan et al.

(10) Patent No.: US 10,101,928 B2
(45) Date of Patent: Oct. 16, 2018

(54) SYSTEM AND METHOD FOR ENHANCED SECURITY AND UPDATE OF SMM TO PREVENT MALWARE INJECTION

(71) Applicant: Dell Products L.P., Round Rock, TX (US)

(72) Inventors: Vijay Bharat Nijhawan, Austin, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 15/048,768

(22) Filed: Feb. 19, 2016

(65) Prior Publication Data
US 2017/0242598 A1     Aug. 24, 2017

(51) Int. Cl.
| | |
|---|---|
| *G06F 3/06* | (2006.01) |
| *G06F 11/22* | (2006.01) |
| *G06F 12/14* | (2006.01) |
| *G06F 9/44* | (2018.01) |
| *G11C 11/406* | (2006.01) |

(Continued)

(52) U.S. Cl.
CPC ............ *G06F 3/0619* (2013.01); *G06F 3/065* (2013.01); *G06F 3/067* (2013.01); *G06F 8/654* (2018.02); *G06F 11/2284* (2013.01); *G06F 12/1466* (2013.01); *G06F 21/34* (2013.01);

(Continued)

(58) Field of Classification Search
CPC ........ G06F 3/0619; G06F 3/065; G06F 3/067; G06F 9/4406; G06F 11/2284; G06F 12/1466; G06F 9/44505; G06F 9/5016; G06F 9/5077; G06F 21/56; G06F 21/566; G06F 21/575; G06F 21/554; G06F 21/572; G06F 2221/034; G06F 9/4401; G06F 9/4812; G06F 9/3877; G06F 21/80;

(Continued)

(56) References Cited

U.S. PATENT DOCUMENTS

| | | | |
|---|---|---|---|
| 5,764,999 A | | 6/1998 | Wilcox et al. |
| 5,796,984 A | * | 8/1998 | Pearce .................... G06F 9/455 703/24 |

(Continued)

*Primary Examiner* — Benjamin E Lanier
*Assistant Examiner* — Shu C Gao
(74) *Attorney, Agent, or Firm* — Baker Botts L.L.P.

(57) ABSTRACT

An information handling system for enhanced system management mode (SMM) security may include a processor, system management random access memory (SMRAM), persistent memory, and basic input/output (BIOS) memory. The system may include instructions that, when loaded and executed by the processor, cause the processor to initialize the memory, initialize the BIOS memory, initialize the persistent memory, and check whether the system has previously executed a power-on self test (POST) routine. Based on a determination that the system has not previously executed a POST routine, the processor may unzip the SMM Code located in the BIOS memory store the unzipped SMM Code in the persistent memory and in the SMRAM. Based on a determination that the system has previously executed a POST routine, the processor may create a duplicate copy of the SMM Code from the persistent memory and store the duplicate copy in the SMRAM. The processor may further initialize the SMRAM, lock the SMRAM, and hide the SMM Code stored in the persistent memory.

15 Claims, 5 Drawing Sheets

(51) Int. Cl.
   *G06F 21/34* (2013.01)
   *G06F 21/57* (2013.01)
   *G06F 8/654* (2018.01)
   *G06F 9/4401* (2018.01)

(52) U.S. Cl.
   CPC .......... *G06F 21/572* (2013.01); *G06F 9/4401* (2013.01); *G06F 2221/033* (2013.01)

(58) Field of Classification Search
   CPC ............. G06F 2211/1097; G06F 21/57; G06F 9/4416; G06F 9/24; G11C 11/40615; G06Q 20/206
   See application file for complete search history.

(56) References Cited

U.S. PATENT DOCUMENTS

| | | | | |
|---|---|---|---|---|
| 6,711,675 | B1* | 3/2004 | Spiegel | G06F 9/4401 713/164 |
| 6,895,517 | B2* | 5/2005 | Wang | G06F 1/3203 713/300 |
| 7,149,854 | B2* | 12/2006 | Weber | G06F 21/575 711/150 |
| 7,260,848 | B2* | 8/2007 | Zimmer | G06F 9/4401 380/200 |
| 9,110,678 | B1* | 8/2015 | Chan | G06F 8/654 |
| 9,240,924 | B2* | 1/2016 | Maity | H04L 41/082 |
| 9,542,195 | B1* | 1/2017 | Astarabadi | G06F 9/4411 |
| 9,846,617 | B2* | 12/2017 | Rahardjo | G06F 11/1417 |
| 9,852,298 | B2* | 12/2017 | Jeansonne | G06F 21/575 |
| 2003/0028781 | A1* | 2/2003 | Strongin | G06F 9/24 713/182 |
| 2004/0243766 | A1 | 12/2004 | Lovelace | |
| 2009/0119748 | A1 | 5/2009 | Yao et al. | |

\* cited by examiner

SYSTEM AND METHOD FOR ENHANCED SECURITY AND UPDATE OF SMM TO PREVENT MALWARE INJECTION

BACKGROUND

Field of the Disclosure

This disclosure relates generally to information handling systems and more particularly to an enhanced security and update of SMM to prevent malware injection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include some type of temporary information storage medium, such as random access memory (RAM) or system management RAM (SM-RAM). In certain information handling systems, a basic input/output system (BIOS) may include BIOS firmware for various hardware management tasks.

Information handling systems and computer systems may include a system management mode (SMM). SMM may be a special purpose operating mode for handling system wide functions while normal execution is suspended and other software, called SMM Code, is executed with high privileges.

SMM may include a vulnerability of "cache poisoning," where SMM Code is made cacheable and then the cached version is replaced with incorrect or harmful instructions.

SUMMARY

In accordance with the present disclosure, a system and method are herein disclosed for enhanced security of SMM Code. In one aspect, a disclosed method may include detecting whether the system has performed a power on self-test (POST) routine previously. Responsive to detecting that no POST routine has previously been run, the method may include unzipping the SMM code from the BIOS flash memory and placing a copy of the unzipped code in a portion of memory that is persistent memory. Persistent memory is battery-backed up random access memory, such as a non-volatile dual in-line memory module (NVDIMM). At the end of POST, either before or after the routine ends, the system may hide at least the portion of persistent memory that includes the copy of SMM Code.

In accordance with the present disclosure, a system and method are herein disclosed for enhanced security update of SMM Code. In one aspect, a disclosed method includes allowing an update, either a patch or whole update, to SMM Code using a signed image. Before it is allowed to update the SMM Code or the cached copy of SMM Code in persistent memory, the system will validate the update. Based on a determination that the new SMM Code is valid, the system will replace the portion or whole of the cached copy of SMM Code that is stored in persistent memory with the update. Through the use of this invention, critical patch updates can be applied by BIOS vendors without completely updating the BIOS.

In an information handling system, system memory is vulnerable to destructive attacks by vicious predators such as rootkit attacks and other destructive programs. The system and method disclosed herein are technically advantageous because a mechanism is provided for eliminating the risks of system memory attacks and compromises to data storage posed by such attacks. In particular, the present disclosure provides a way for an information handling system to provide secure SMM Code and allow secure updates of SMM Code. The solution disclosed herein will speed-up boot times, because SMM Code may not need to be unzipped from flash after the first POST routine. This enhanced system and method also prevent SMM cache poisoning. By effectively protecting system memory from vicious attacks that could destroy or compromise sensitive temporary data, data integrity is preserved. Overall system costs for the information handling system are correspondingly reduced as destructive attacks that allow sensitive information to be accessed surreptitiously by another system or program are prevented. Other technical advantages will be apparent to those of ordinary skill in the art in view of the following specification, claims, and drawings.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), system management RAM (SMRAM), read-only memory (ROM), electrically erasable programmable read-only memory (EEPROM), persistent memory, and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware that may control certain hardware elements and may provide for user management of the hardware elements. A BIOS non-volatile memory may store a zipped copy of SMM Code. Without the invention disclosed herein, the SMM Code must be unzipped at each boot-up, a process that is slow and increases boot-up time. Moreover, malware can maliciously use SMM Mode to replace the SMM Code stored in SMRAM.

As will be described in further detail herein, the inventors of the present disclosure have developed an enhanced security and update of SMM Code.

Particular embodiments are best understood by reference to FIGS. 1, 2, 3 and 4, wherein like numbers are used to indicate like and corresponding parts.

Figure 1:
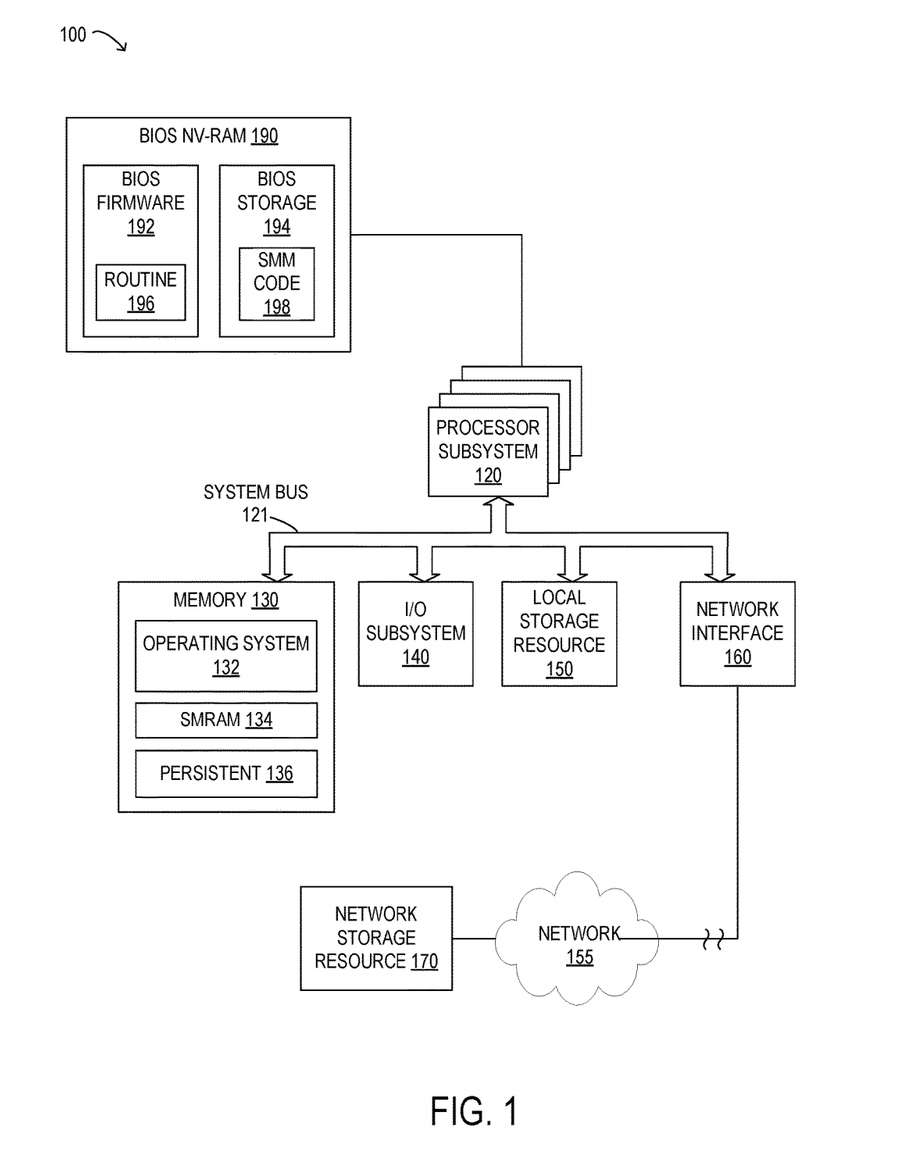
FIG. 1 is a block diagram of selected elements of an embodiment of an information handling system using a BIOS security display.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). Memory 130 may comprise random access memory (RAM), electrically erasable programmable read-only memory (EEPROM), a PCMCIA card, flash memory, magnetic storage, opto-magnetic storage, persistent memory and/or a suitable selection and/or array of volatile or non-volatile memory that retains data after power to its associated information handling system, such as information handling system 100, is powered down. As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155.

In one embodiment, memory 130 may include system memory random access memory (SMRAM) 134. As shown in the example embodiment of FIG. 1, SMRAM 134 may be a portion of memory. SMRAM may be a portion of memory reserved for storage of SMM Code, pre-SMM CPU state, and other data for SMM.

In another embodiment, memory 130 may include persistent memory 136. Persistent memory 136 may retain data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel may include circuitry for enabling touch functionality in conjunction with a display that is driven by display adapter.

In one embodiment, system 100 may include a BIOS non-volatile random access memory (NV-RAM) 190. The BIOS NV-RAM 190 is a type of firmware used to perform hardware initialization during the booting process (power-on startup) on computers, and to provide runtime services for operating systems and programs. BIOS firmware is built into system 100 at NV-RAM 190, and it is the first software run when it is powered on. BIOS NV-RAM 190 may be referred to as the 'BIOS'. BIOS NV-RAM 190 may be implemented in any suitable manner. For example, BIOS NV-RAM 190 may include BIOS firmware 192. BIOS firmware 192 may include pre-boot instructions executable by processor subsystem 120. Pre-boot instructions are the first steps a computer system takes when powered on from an off state. These instructions may, for example, prepare information handling system 100 to boot by activating various hardware components (e.g. hard drive, monitor, etc.) in preparation of launching operating system 132 for execution. BIOS firmware 192 may include routine 196. Routine 196 may include code that, fully or in-part, performs enhanced security and update of SMM algorithms described herein. BIOS NV-RAM 190 may also include BIOS storage 194. BIOS storage may include data, such as program code, settings, data values, etc. that BIOS firmware 192 may store. In certain embodiments, BIOS firmware 192 may be configured to access network interface 160 for various types of communication, such as with a network administrator. In certain embodiments, at least a portion of BIOS storage 194 may physically reside on a remote storage resource, such as in network storage resource 170. BIOS storage 194 may include SMM Code 198. In certain embodiments SMM Code 198 is stored on flash in a compressed format, such as .ZIP. SMM Code may include special purpose instructions executed with high privileges for handling system wide functions. SMM Code may include instructions to suspend normal execution so that SMM functionality is able to perform instructions on the most protected data. BIOS NV-RAM 190 will be shown in more detail in the figures that follow.

Instructions are simple commands in a language which the processor can understand. Most software is written in a higher-level language that is compiled into instructions and stored in memory. Processors execute a program by fetching the corresponding instructions from memory and then executing those instructions. Execution is the performance of the operations or calculations of an instruction.

As referred to herein, BIOS firmware 192 may include instructions executing on processor subsystem 120. It is noted that other processors and/or processor subsystems, such as an embedded controller (EC) or a secondary processor (not shown), may be used to execute BIOS firmware 192 in various embodiments.

In operation, when information handling system 100 is powered on from an off state, BIOS firmware 192 may be launched and may execute on processor subsystem 120.

Figure 2A:
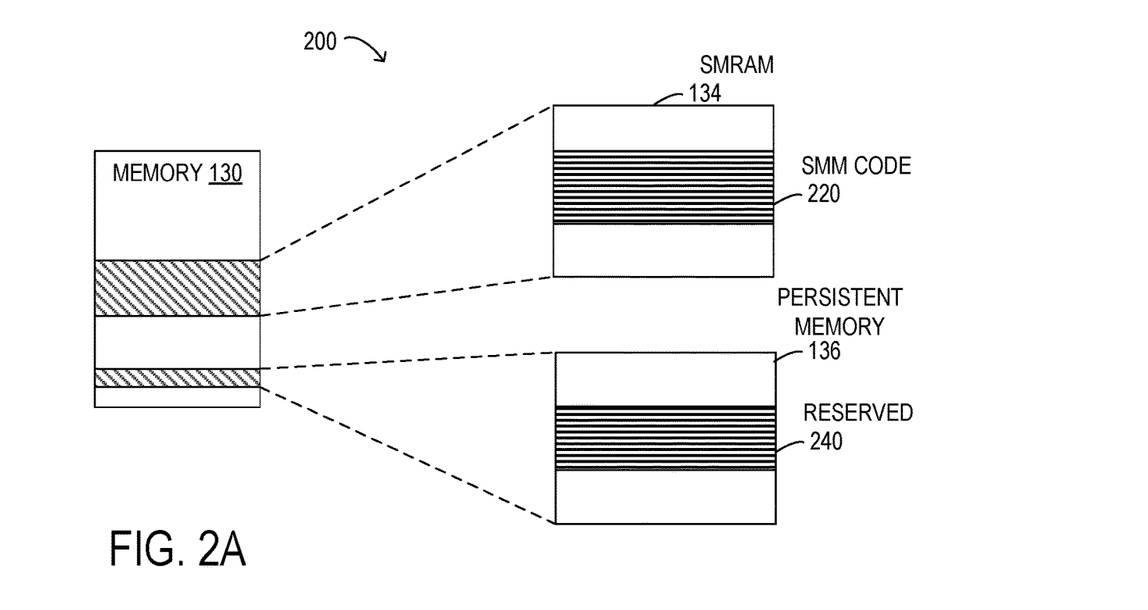
FIG. 2A is a block diagram of memory, including SMRAM, SMM Code, Persistent Memory, and Reserved Persistent Memory.
Figure 2B:
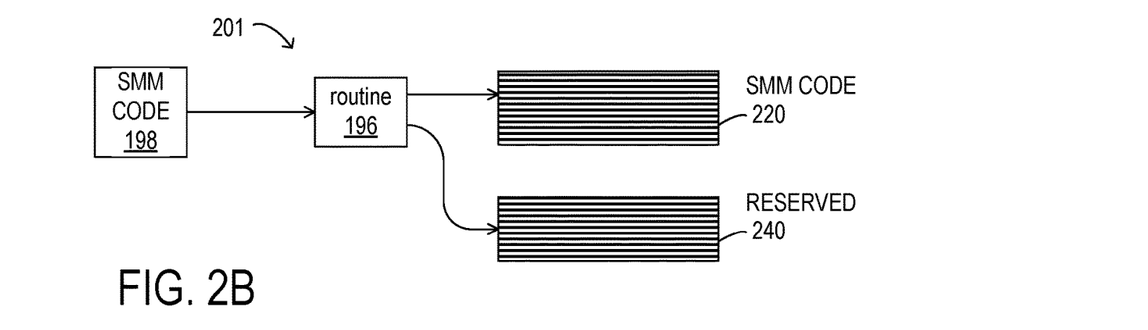
FIG. 2B is a block diagram of the data flow at the first POST, this data flow may also occur after a malware attack is detected.
Figure 2C:
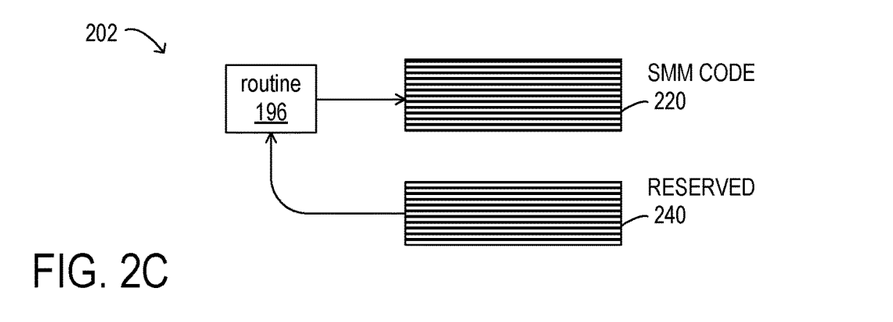
FIG. 2C is a block diagram of the data flow at the non-first POST, this data flow may also occur after a malware attack is detected.
Figure 2D:
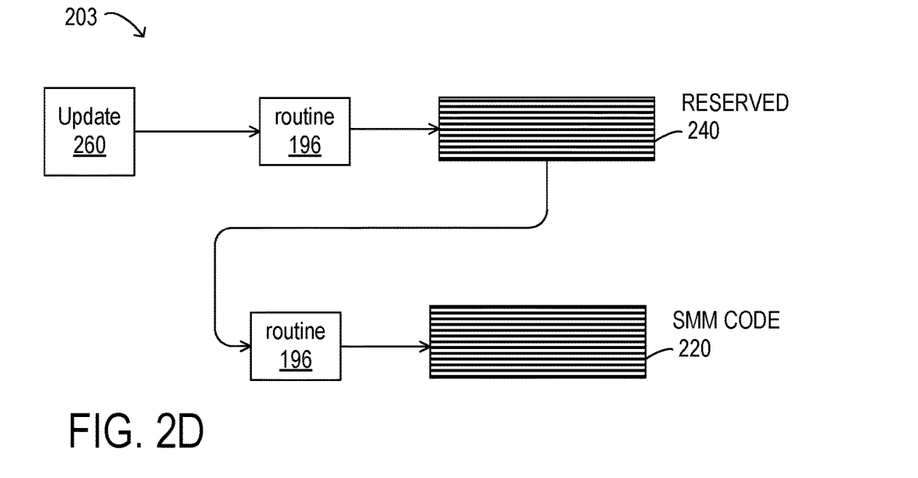
FIG. 2D is a block diagram of the data flow when an update is requested and validated.

FIGS. 2A-2D are block diagrams of the operation of SMM according to certain embodiments of the present disclosure. FIG. 2A shows the locations in memory that are being used according to certain embodiments of the present disclosure. FIG. 2B is the data flow that may be performed during the first ever start-up process of system 100, as well as being optionally performed after a malware attack on the SMM is detected. In addition, it may also be performed in other circumstances such as if persistent memory is replaced or upon a persistent memory power failure. FIG. 2C is the data flow that may be performed during subsequent (not the first) start-up process of system 100, as well as being optionally performed after a malware attack on the SMM is detected. FIG. 2D is the data flow that may be performed during a valid update of SMM Code.

FIG. 2A is a more detailed block diagram of SMRAM 134 and persistent memory 136, according to embodiments of the present disclosure. SMRAM 134 and persistent memory 136 may be included in memory 130. In one embodiment, SMRAM 134 may include SMM Code 220. SMM Code are instructions executed with high privileges that suspend normal operation and allow system wide activities to occur. Persistent memory 136 may be a non-volatile dual in-line memory module (NVDIMM) or any other type of persistent memory (i.e., memory that retains its information when power is turned off) known to one of ordinary skill in the art. Also shown, persistent memory 136 may include reserved persistent memory 240.

FIG. 2B is an illustration of operation of system 100, including data flow 201 at first power-on self test, according to embodiments of the present disclosure. POST is a process that may be performed by firmware or software after the system is powered on from an off state in order to verify that the hardware is functioning normally. If POST completes successfully, the system will then generally fetch the instructions necessary to start an operating system. For example, data flow 201 may represent data flow at the first POST of the computer system. One example of a way routine 196 may detect first POST of the computer system is through the use of a valid data flag in persistent memory that would indicate that data flow 201 had previously completed successfully and that the SMM data in persistent memory remains valid. Routine 196 may initialize the BIOS 190. BIOS initialization may include the pre-boot Firmware initialization from power-on through to the launch of operating system Routine 196 may also initialize memory 130. Routine 196 may also initialize the persistent memory 136. Then, SMM Code 198 may be copied from BIOS storage 194 by execution of the instructions of routine 196. In certain embodiments, the SMM Code 198 is then uncompressed or unzipped by routine 196. Routine 196 places a copy of the unzipped SMM Code in reserved persistent memory 240 and in SMM Code 220. The process of placing a copy of the unzipped SMM Code in SMM Code 220 may also be called creating a copy in the cache. Routine 196 may then lock the SMRAM 134. One way of locking the SMRAM is to use the D_LOCK Bit. Routine 196 may also hide the reserved area of persistent memory 240. A person of ordinary skill would recognize that there are a number of ways to hide reserved persistent memory 240. Possible ways to hide reserved persistent memory 240 includes GetMemoryMap( ) in UEFI, which is a type of BIOS firmware. Another possible way to hide reserved persistent memory 240 includes the operation int 15-E820 in pre-UEFI BIOS firmware. The step of hiding the reserved area of persistent memory may happen before or after the end of the POST routine, but should occur before the system performs an "Exit BootServices" or "Boot to OS" or similar function to make sure that the reserved persistent memory is protected from corruption.

In certain embodiments, data flow 201 may be performed after a malware attack is detected. As described herein, a malware attack may be detected as part of an update request 260 in FIG. 2D. If such a malware attack is detected, the system has the option to run data flow 201 to ensure the SMM Code in SMRAM 134 and reserved persistent memory 240 are both correct. One example of a possible way routine 196 may indicate a malware attack has been detected is by invalidating a data flag in persistent memory that would indicate that no valid SMM Code is located in persistent memory.

In certain embodiments, data flow 201 may be performed in other circumstances such as if persistent memory 136 is replaced or upon a persistent memory 136 power failure. Such a circumstance may be detected by routine 196 during data flow 201. One possible way for routine 196 to detect that persistent memory 136 was replaced or had a power failure is through the use of a valid data flag in persistent memory that would indicate to that no valid SMM Code is located in persistent memory.

FIG. 2C is an illustration of further operation of system 100, including data flow 202, upon startup from a power-off state when the system is not performing its first POST routine. This is the normal operation of a system at start-up from a power-off state, when the system has previously completed any startup.

In one embodiment, data flow 202 may be performed at a POST subsequent to the first POST (e.g. reset or subsequent power-on from an off state) whose operation is illustrated in FIG. 2B. Routine 196 may initialize memory 130. Routine 196 may also initialize the BIOS 190.

In data flow 202, which is one embodiment of the present disclosure, the unzipped data stored at reserved persistent memory 240 is copied by routine 196 and placed in SMM Code 220. Thus, on this boot-up, the data is copied without unzipping or decompressing a copy of SMM Code from BIOS storage 194, thus boot-up time may be reduced. Routine 196 may then lock the SMRAM 134. One way of locking the SMRAM is to use the D_LOCK Bit. Routine 196 may also hide the reserved area of persistent memory 240. A person of ordinary skill would recognize that there are a number of ways to hide reserved persistent memory 240. Possible ways to hide reserved persistent memory 240 includes GetMemoryMap( ) in UEFI, which is a type of BIOS firmware. Another possible way to hide reserved persistent memory 240 includes the operation int 15-E820 in pre-UEFI BIOS firmware. The step of hiding the reserved area of persistent memory may happen before or after the end of the POST routine, but should occur before the system performs an "Exit BootServices" or "Boot to OS" or similar function to make sure that the reserved persistent memory is protected from corruption.

In certain embodiments, the data flow depicted at 202 may also occur after a malware attack is detected. As described herein, a malware attack may be detected as part of an update request 260 in FIG. 2D. If such a malware attack is detected, the system has the option to run data flow 202 to ensure the SMM Code 220 in SMRAM 134 matches the code in reserved persistent memory 240. One example of a possible way routine 196 may indicate a malware attack has been detected is by invalidating a data flag in persistent memory that would indicate that no valid SMM Code is located in persistent memory.

FIG. 2D is an illustration of further operation of system 100, including data flow 203, upon receiving a valid request to update SMM Code. An update request may be a request to update all the SMM Code or may be a request to update a portion of the SMM Code. As shown, routine 196 receives the signed image of a SMM patch and updates reserved persistent memory 240. Then, validation of the update may occur in routine 196 using a public key that system BIOS carries using SecureBoot Keys. SecureBoot Keys is a Microsoft™ OS routine. A valid update is one that includes a key that indicates it is an authorized update to the BIOS. An invalid update is one that does not have an authorized key. If the update is a valid update, routine 196 will update SMM Code 220. If the update is not valid, then the system assumes that a malware attack on the SMM has been attempted. In response, the system will overwrite its copy of SMM Code 220 to ensure that the SMM Code 220 is valid. To ensure that the SMM Code 220 is valid, routine 196 may perform data flow 201 from FIG. 2B and unzip or uncompress SMM Code 198 and place a copy of the unzipped data in reserved persistent memory 240 and SMM Code 220. In another embodiment, when the update is not valid then routine 196 may perform data flow 202 and the unzipped data stored at reserved persistent memory 240 is copied by routine 196 and placed in SMM Code 220. Routine 196 may then lock the SMRAM 134. One way of locking the SMRAM is to use the D_LOCK Bit. Routine 196 may also hide the reserved area of persistent memory 240. A person of ordinary skill would recognize that there are a number of ways to hide reserved persistent memory 240. Possible ways to hide reserved persistent memory 240 includes GetMemoryMap( ) in UEFI, which is a type of BIOS firmware. Another possible way to hide reserved persistent memory 240 includes the operation int 15-E820 in pre-UEFI BIOS firmware. The step of hiding the reserved area of persistent memory may happen before or after the end of the POST routine, but should occur before the system performs an "Exit BootServices" or "Boot to OS" or similar function to make sure that the reserved persistent memory is protected from corruption.

Figure 3:
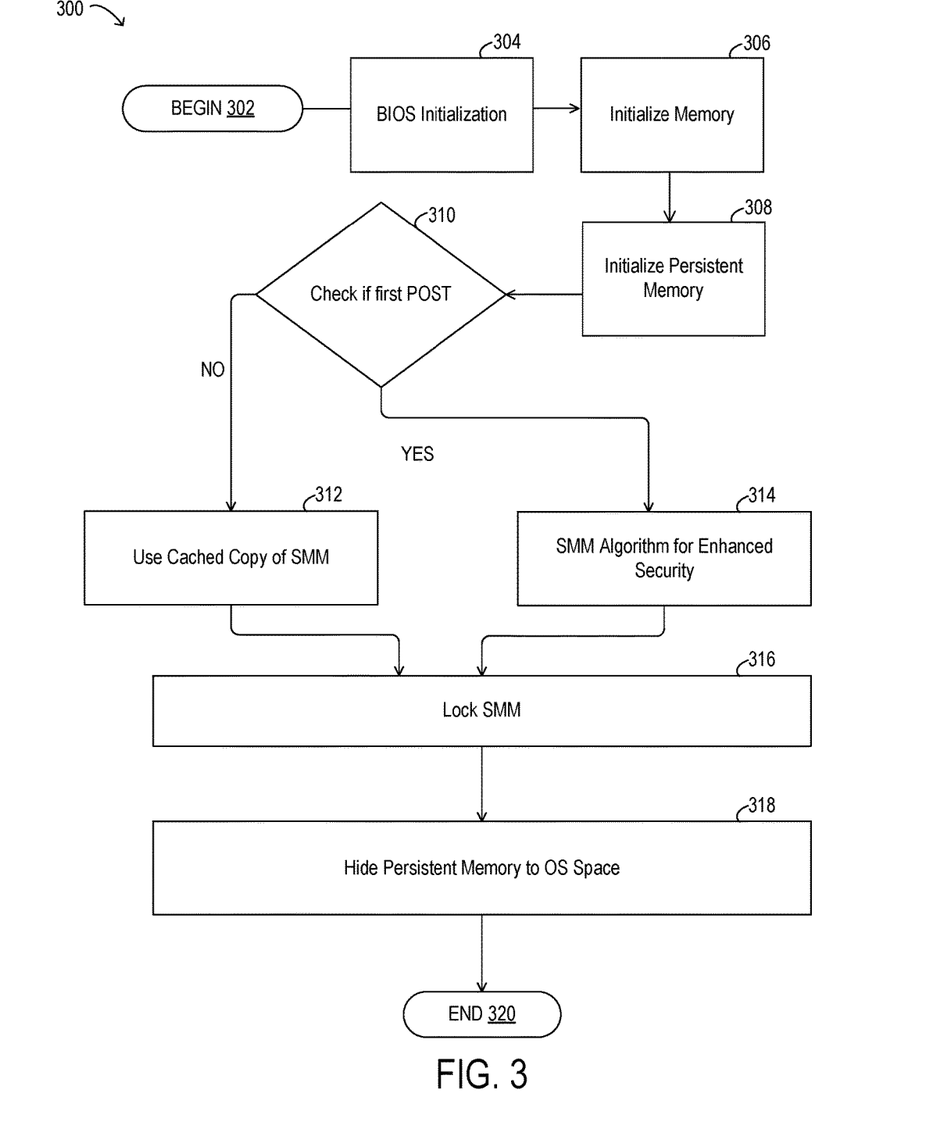
FIG. 3 is a flowchart depicting selected elements of an embodiment of a method for enhanced SMM security.

FIG. 3 is a flowchart of selected elements of a method 300 for enhanced security and update of SMM, according to embodiments of the present disclosure. Method 300 may be performed using information handling system 100 (see FIG. 1). In particular embodiments, method 300 is performed by execution of routine 196. Various operations described in method 300 may be optional or may be rearranged in different embodiments. Other operations, not shown, may be performed during execution of method 300. One or more operations of method 300 may be repeated, executed recursively, or conducted in parallel with other operations of method 300. Method 300 may be initiated upon any suitable input.

Method 300 may begin at operation 302. Operation 302 may be a power-on or reset event. Then, routine 196 may initialize the BIOS 190 (operation 304). Routine 196 may also initialize memory 130 (operation 306). Routine 196 may also initialize the persistent memory 136 (operation 308). The step of BIOS initialization 304 may include the pre-boot Firmware initialization from power-on through to the launch of operating system. Afterwards, a decision may be made whether the system is performing its first ever POST routine (operation 310). One example of a possible way to detect that circumstance is through the use of a valid data flag in persistent memory that would indicate that data flow 201 had previously completed successfully and that the SMM data in persistent memory is valid. If the system is performing its first POST routine, method 300 may unzip the SMM Code that is stored in BIOS NV-RAM 190 and places an unzipped copy in a reserved area of persistent memory 136 (operation 314). Operation 314 may also initialize the SMRAM 134 with an unzipped copy of SMM Code. After SMRAM initialization, the SMM has the handlers which can be executed based on secure system management interrupt (SMI) interrupts. If the system is not performing its first POST routine, then the unzipped copy of SMM Code that is in persistent memory 136 may be used to initialize SMRAM 134 (operation 312). Method 300 may lock the SMRAM 134. One way of locking the SMRAM is to use the D_LOCK Bit. Method 300 may then hide the reserved area of persistent memory 240 (operation 318). A person of ordinary skill would recognize that there are a number of ways to hide reserved persistent memory 240. Possible ways to hide reserved persistent memory 240 includes GetMemoryMap( ) in UEFI, which is a type of BIOS firmware. Another possible way to hide reserved persistent memory 240 includes the operation int 15-E820 in pre-UEFI BIOS firmware. The step of hiding the reserved area of persistent memory may happen before or after the end of the POST routine, but should occur before the system performs an "Exit BootServices" or "Boot to OS" or similar function to make sure that the reserved persistent memory is protected from corruption. Method 300 may end at operation 320.

Method 300 may be implemented using system 100, components thereof or any other system such as those shown in FIGS. 1-4 operable to implement method 300. In certain embodiments, method 300 may be implemented partially or fully in software and/or firmware embodied in computer-readable media.

Figure 4:
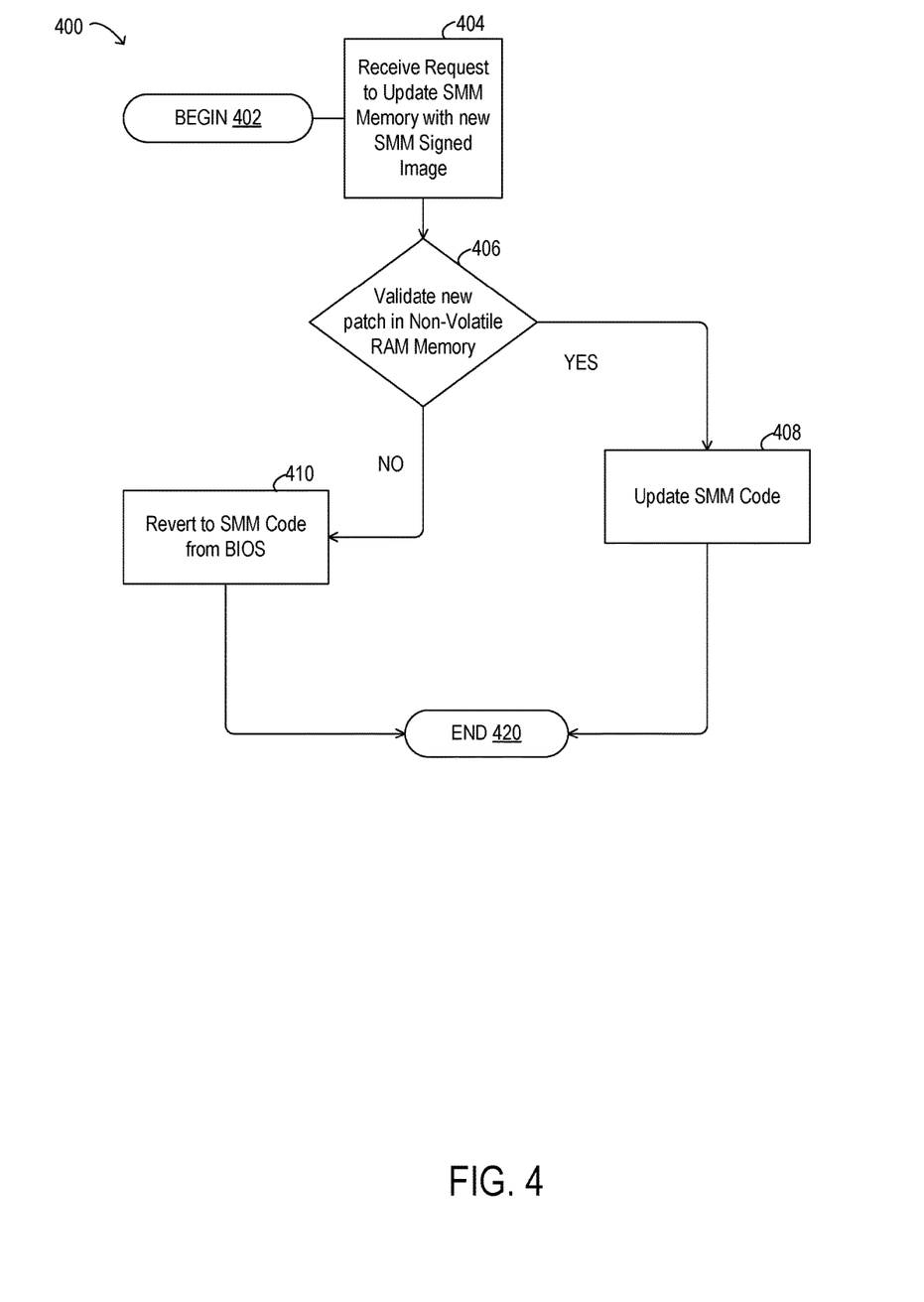
FIG. 4 is a flowchart depicting selected elements of an embodiment of a method for enhanced security SMM update.

FIG. 4 is a flowchart of selected elements of a method 400 for enhanced security and update of SMM, according to embodiments of the present disclosure. Method 400 may be performed using information handling system 100 (see FIG. 1). In particular embodiments, method 400 is performed by execution of routine 196. Various operations described in method 400 may be optional or may be rearranged in different embodiments. Other operations, not shown, may be performed during execution of method 300. One or more operations of method 400 may be repeated, executed recursively, or conducted in parallel with other operations of method 400. Method 400 may be initiated upon any suitable input. It is noted that method 400 may be executed or repeated as needed to update the SMM Code with patches.

Method 400 may begin at operation 402. At operation 404, the system 100 receives a request to update the SMM memory with a patch. In certain embodiments, the patch to SMM memory may be a signed image that can be authenticated using, for example, Microsoft™ SecureBoot Keys. At operation 406, the method 400 will validate the update. In certain embodiments, validation may be done using SecureBoot Keys. If the system is detects a valid update, method 400 may update the SMM Code 220 stored in SMRAM 134 and the SMM Code stored in a reserved portion of persistent memory 136 (operation 408). If the system is detects an update that is not valid, method 400 may unzip the SMM Code from BIOS 190 and replace the copy in persistent memory 136 and SMM Code 220 (operation 410). The step of replacing may involve invalidating the old copy and using a different memory location(s), alternatively, replacing may involve copying on top of the prior memory location(s). In other embodiments, when the system is detects an update that is not valid, method 400 may end. Method 400 may end at operation 420.

Method 400 may be implemented using system 100, components thereof or any other system such as those shown in FIGS. 1-4 operable to implement method 400. In certain embodiments, method 400 may be implemented partially or fully in software and/or firmware embodied in computer-readable media.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system for enhanced system management mode (SMM) security, comprising:
   a processor;
   a memory, including:
      a system management random access memory (SMRAM) included in the memory; and
      a persistent memory;
   a basic input/output (BIOS) memory;
   instructions included in the memory, the instructions, when loaded and executed by the processor, cause the processor to:
      initialize the memory;
      initialize the BIOS memory;
      initialize the persistent memory;
      determine whether the system has previously executed a power-on self test (POST) routine;

based on a determination that the system has not previously executed a POST routine:
   unzip a SMM Code located in the BIOS memory; and
   store the unzipped SMM Code in the persistent memory and in the SMRAM;
based on a determination that the system has previously executed a POST routine:
   create a duplicate copy of the SMM Code from the persistent memory; and
   store the duplicate copy in the SMRAM;
initialize the SMRAM;
lock the SMRAM; and
hide the SMM Code stored in the persistent memory.

2. The system of claim 1, further including instructions to cause the processor to:
   receive a request to update the SMM Code;
   validate the request to update; and
   based on a determination that the request to update is not valid:
      unzip the SMM Code located in the BIOS memory;
      replace the SMM Code stored in the persistent memory and in the SMRAM with the unzipped SMM Code;
      lock the SMRAM; and
      hide the unzipped SMM Code stored in the persistent memory.

3. The system of claim 1, further including instructions to cause the processor to:
   receive a request to update the SMM Code;
   validate the request to update; and
   based on a determination that the request to update is not valid:
      create a duplicate copy of the SMM Code stored in the persistent memory;
      store the duplicate copy in the SMRAM;
      lock the SMRAM; and
      hide the SMM Code stored in the persistent memory.

4. The system of claim 1, further including instructions to cause the processor to:
   receive a request to update the SMM Code;
   validate the request to update; and
   based on a determination that the request to update is valid:
      create a updated copy of SMM Code based on the request to update;
      store the updated copy in the persistent memory and in the SMRAM;
      lock the SMRAM; and
      hide the updated copy stored in the persistent memory.

5. The system of claim 4, further including instructions to cause the processor to update the SMM Code in BIOS memory based on the request to update.

6. An article of manufacture, comprising:
   a non-transitory computer readable storage medium;
   computer-executable instructions carried on the computer readable medium, the instructions readable by a processor, the instructions, when read and executed, for causing the processor to:
      initialize a memory;
      initialize a BIOS memory;
      initialize a persistent memory;
      initialize a SMRAM;
      determine whether the system has previously executed a power-on self test (POST) routine;
      based on a determination that the system has not previously executed a POST routine:
         unzip a SMM Code located in the BIOS memory;
         store the unzipped SMM Code in the persistent memory and in the SMRAM;
      based on a determination that the system has previously executed a POST routine:
         create a duplicate copy of the SMM Code stored in the persistent memory;
         store the duplicate copy in the SMRAM;
      lock the SMRAM; and
      hide the SMM Code stored in the persistent memory.

7. The article of manufacture of claim 6, wherein the computer-executable instructions are further configured to:
   receive a request to update the SMM Code;
   validate the request to update;
   based on a determination that the request to update is not valid:
      unzip the SMM Code located in the BIOS memory;
      replace the SMM Code stored in the persistent memory and in the SMRAM with the unzipped SMM Code;
      lock the SMRAM; and
      hide the unzipped SMM Code stored in the persistent memory.

8. The article of manufacture of claim 7, wherein the computer-executable instructions are further configured to:
   receive a request to update the SMM Code;
   validate the request to update;
   based on a determination that the request to update is not valid:
      create a duplicate copy of the SMM Code stored in the persistent memory;
      store the duplicate copy in the SMRAM;
      lock the SMRAM; and
      hide the initial copy stored in the persistent memory.

9. The article of manufacture of claim 7, wherein the computer-executable instructions are further configured to:
   receive a request to update the SMM Code;
   validate the request to update;
   based on a determination that the request to update is valid:
      create an updated copy based on the request to update;
      store the updated copy in the persistent memory and in the SMRAM;
      lock the SMRAM; and
      hide the updated copy stored in the persistent memory.

10. A method for providing enhanced system management mode (SMM) security, comprising:
   detecting that the system has not previously executed a power-on self test (POST) routine;
   in response to detecting that the system has not previously executed a POST routine:
      creating an initial copy of a SMM Code from a basic input/output (BIOS) memory;
      storing the initial copy in a persistent memory; and
      hiding the initial copy stored in the persistent memory
      triggering a BIOS power-on self test (POST) POST routine;
   detecting that the system has previously executed a POST routine; and
   in response to detecting that the system has previously executed a POST routine:
      creating a duplicate copy of the SMM Code stored in the persistent memory,
      storing the duplicate copy in an SMRAM a system management random access memory (SMRAM);
   initializing the SMRAM;
   locking the SMRAM; and
   hiding the SMM Code stored in the persistent memory.

11. The article of manufacture of claim 10, wherein the computer-executable instructions are further configured to update the SMM Code in the BIOS memory based on the request to update.

12. The method of claim 10, further comprising:
receiving a request to update the SMM Code;
validating the request to update; and
based on a determination that the request to update is not valid:
  creating a replacement copy of SMM Code from the BIOS memory;
  storing the replacement copy in the persistent memory and SMRAM;
  locking the SMRAM; and
  hiding the replacement copy stored in persistent memory.

13. The method of claim 10, further comprising:
receiving a request to update the SMM Code;
validating the request to update; and
based on a determination that the request to update is not valid:
  creating a duplicate copy of the SMM Code stored in persistent memory;
  storing the duplicate copy in the SMRAM;
  locking the SMRAM; and
  hiding the SMM Code stored in persistent memory.

14. The method of claim 10, further comprising:
receiving a request to update the SMM Code;
validating the request to update;
based on a determination that the request to update is valid:
  creating a replacement copy based on the request to update;
  storing the replacement copy in the persistent memory and in the SMRAM;
  locking the SMRAM; and
  hiding the replacement copy stored in persistent memory.

15. The system of claim 10, further comprising updating the SMM Code in the BIOS memory based on the request to update.

* * * * *